(No Model.) 3 Sheets—Sheet 2.

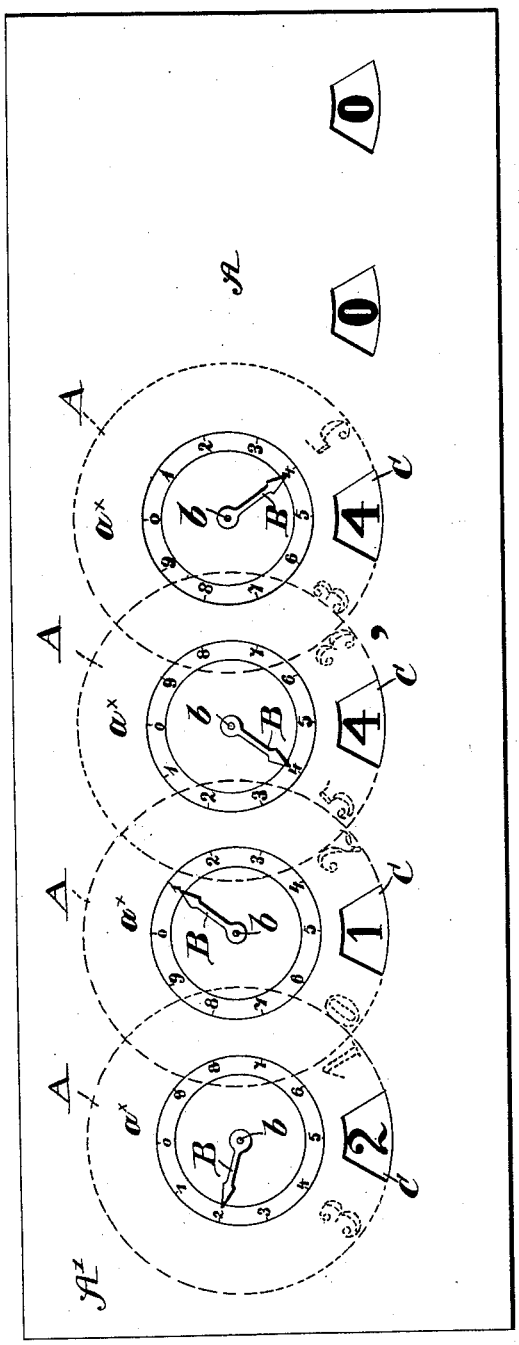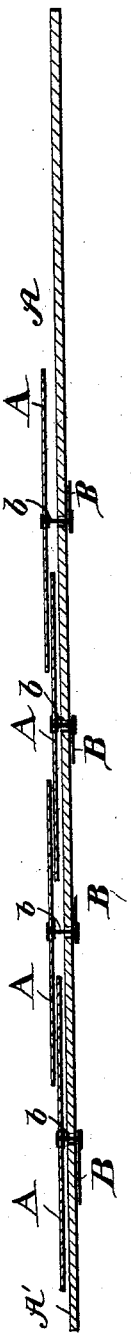

A. T. DANKS.
REGISTER FOR GAS OR OTHER METERS.

No. 433,331. Patented July 29, 1890.

Witnesses:
Henry G. Dieterich
J. Thompson Cross

Inventor:
Aaron T. Danks,
per: Henry W.
Atty's.

(No Model.) 3 Sheets—Sheet 3.
A. T. DANKS.
REGISTER FOR GAS OR OTHER METERS.
No. 433,331. Patented July 29, 1890.
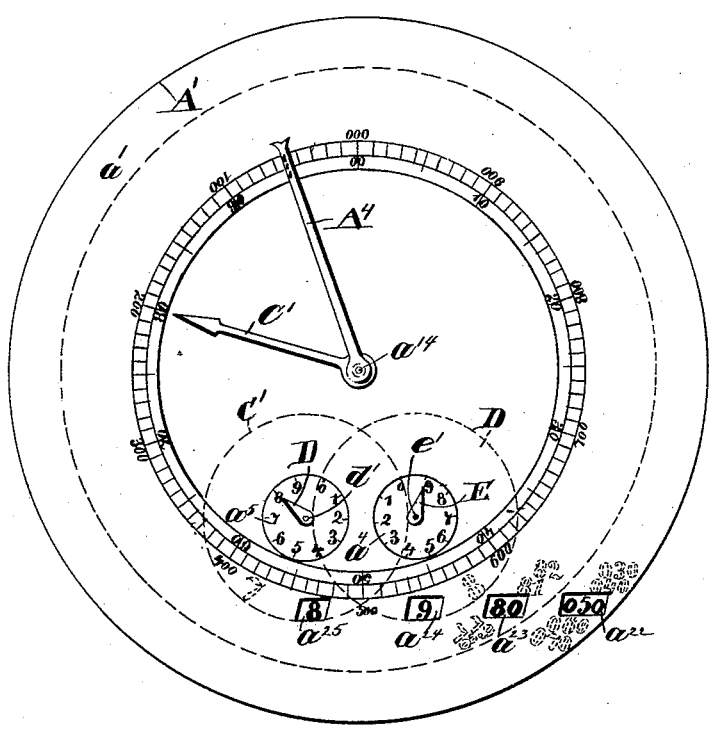
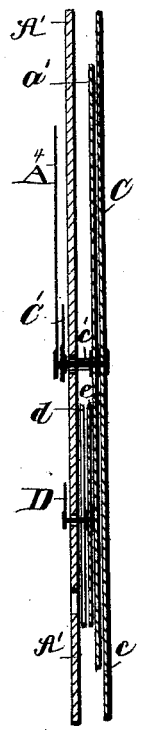
Witnesses:
Henry J. Dieterich
J. Thomson Cross
Inventor:
Aaron T. Danks,
per:
Henry
Atty's:

UNITED STATES PATENT OFFICE.

AARON TURNER DANKS, OF MELBOURNE, VICTORIA.

REGISTER FOR GAS OR OTHER METERS.

SPECIFICATION forming part of Letters Patent No. 433,331, dated July 29, 1890.

Application filed January 10, 1890. Serial No. 336,504. (No model.)

*To all whom it may concern:*

Be it known that I, AARON TURNER DANKS, brass-founder, a subject of the Queen of Great Britain, residing at No. 403 Bourke Street, Melbourne, in the British Colony of Victoria, have invented certain new and useful Improved Contrivances for Showing in a Single Line the Register of Dials on Gas or other Meters, of which the following is a specification.

Figure 3:
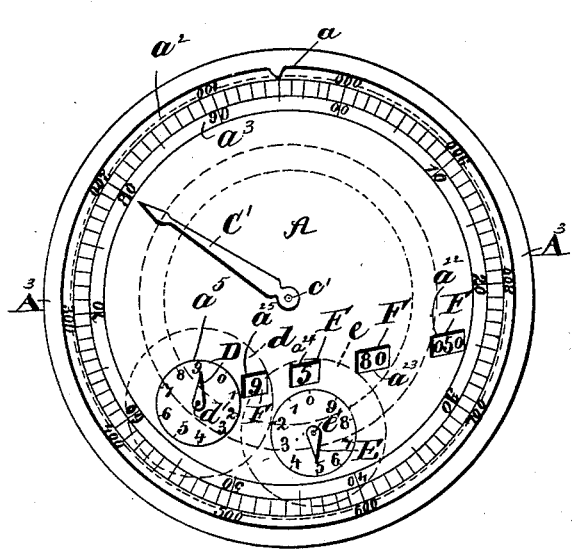
Figure 4:
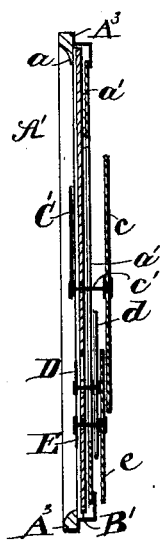

Referring to the drawings, Figure 1 is a face view of a dial-plate for a gas or other fluid meter embodying my invention. Fig. 2 is a longitudinal section thereof, taken on the line of the spindles of the index-fingers. Fig. 3 is a face view of a dial-plate, such as are used in water-meters. Fig. 4 is a vertical section thereof. Fig. 5 is a face view of a modified arrangement of dial-plate, and Fig. 6 is a section of the same.

The invention has for its object to provide a simple means for readily reading the indications on the dials of fluid-meters, in that such indications are presented in a straight line, so that the register of the meter may be read off at a glance.

To these ends the invention consists in the combination, with the dials and index-fingers, of means whereby the indices pointed at by the index-fingers are exposed to view in a straight line, as will now be more fully described, reference being had to the accompanying drawings, in which like letters indicate like parts wherever such may occur in the various views.

Referring to Fig. 1, A′ indicates the dial-plate, having a plurality of graduated and numbered dials $a'$, each of which has an index-finger B revoluble on such dial. The dial-plate is provided with slots C, one for each dial, arranged in a straight line below said dials, and upon the spindle $b$ of each index-finger B is secured a disk D, that has around its margin the same indices as on the dial on which the index-finger on the disk-spindle revolves, said indices being arranged relatively to the finger and the slot C below its dial as that when the finger points to a given graduation or number on its dial $a^\times$ the same graduation or number will be exposed at the slot C below said dial.

The improvement may equally well be applied to water-meters where the dial-plate is usually revoluble, and instead of applying said improvements to a water-meter, or, in fact, to any fluid-meter, I may provide a separate device constructed substantially like the dial-plate of a water or other fluid-meter, and combine therewith my improvements for use in reading the record of such meter, the independent device constituting a meter-reading card.

In Figs. 3 and 4 I have shown such a device adapted for reading the record of a water-meter having a revoluble dial-plate, and in Figs. 5 and 6 I have shown a modification of this card for the reading of the record of any other fluid-meter. In either case the index-fingers of the card are set to correspond with the index-fingers of the meter-register when the sum of the record of such register will be exposed in a straight line on the card, so as to be readily read.

In Figs. 3 and 4 A′ is the revoluble dial-plate, which is as usual arranged behind a fixed plate $A^3$. The dial-plate has two concentric graduated marginal dials $a^2$ $a^3$, instead of one, and within said marginal dials I have shown inscribed two other dials $a^4$ and $a^5$. On the fixed ring $A^3$ is formed or secured a fixed index-finger $a$, that indicates the lowest denominators on the outer marginal dials $a^2$ of the dial-plate A′, while C′ is a revoluble index-finger that indicates the next higher denominators on the inner marginal dial $a^3$ of dial-plate $A^3$, and E and D are the index-fingers for the inscribed dials $a^4 a^5$, respectively, indicating the successively-higher denominators. The dial-plate A′ has openings $a^{22}$ $a^{23}$ $a^{24}$ $a^{25}$, formed therein in a straight line, one for each of the dials $a^2$, $a^3$, $a^4$, and $a^5$, respectively, and upon each of the spindles $c'$, $e'$, and $d'$ of the index-fingers C′, E, and D is secured a disk $c$, $e$, and $d$, respectively, having marginal indices corresponding with those on the dials $a^3$, $a^4$, and $a^5$, respectively, while behind the dial-plate A′ is secured a disk or ring $a'$, that also has marginal indices corresponding with those on the outer marginal dial $a^2$. The indices on the disks are arranged relatively to the index-fingers and the slots or openings in the dial-plate that the numeral or graduation to which such index-finger points will be exposed at the corresponding slot in the dial-plate A'.

In Figs. 5 and 6 the dial-plate A' is constructed substantially like that shown in Figs. 3 and 4, and the fixed index-finger therein shown is here replaced by a revoluble index-finger $A^4$, the index-finger C' having a tubular spindle c' that forms a bearing for the spindle $a^{14}$ of finger $A^4$, as shown in Fig. 6. In this construction the index-finger $A^4$ being revoluble, the disk or ring a' secured thereto is also revoluble, instead of stationary, as in the case of the fixed index a' and disk a'. (Shown in Figs. 3 and 4.)

It will be readily seen that by setting the index-fingers on either reading-card to correspond to the fingers on the meter the register of such meter may be read off at a glance at the slots.

Having described my invention, what I claim, and desire to secure by Letters Patent, is—

1. An index for fluid-meters, comprising a dial-plate having a slot for each of its dials arranged in a straight line, an index-finger for each of said dials, and a disk for each of the index-fingers, said disk being mounted on the spindle of such fingers and having indices corresponding with those of the dials and so positioned on the disks as to be exposed through the slots of the dial-plate, the indices on the disks being so arranged relatively to the indices on the dial-plate and to the slots therein as that when the index-finger of a dial points to a given index thereon a like index will be exposed at the slot of the plate, substantially as and for the purposes specified.

2. An index for fluid-meters, comprising a revoluble dial having a plurality of dials inscribed thereon and a slot for each of said dials, said slots being arranged in a straight line, a fixed index-finger for each of the dials and revoluble index-fingers for each of the other dials, in combination with a stationary disk for the stationary index-finger and a disk mounted on the spindle of each of the revoluble index-fingers, said disks having indices corresponding to those of their respective dials, arranged so as to be exposed through the respective slots of said dials and so that when a given index-finger points to a given index on its dial a like index on its disk will be exposed at the slot of said dial, substantially as and for the purpose specified.

AARON TURNER DANKS.

Witnesses:
WALTER SMYTHE BAYSTON,
WALTER CHARLES HART.